Aug. 18, 1942.　　W. J. MILLER ET AL　　2,293,070
METHOD AND APPARATUS FOR MANUFACTURING POTTERY WARE
Filed Nov. 15, 1939　　3 Sheets-Sheet 1

INVENTORS
WILLIAM J. MILLER
GEORGE J. CRONINGER
BY
*George J. Croninger*
ATTORNEY Patented Aug. 18, 1942

2,293,070

UNITED STATES PATENT OFFICE 2,293,070

METHOD AND APPARATUS FOR MANUFACTURING POTTERY WARE

William J. Miller and George J. Croninger, Swissvale, Pa.; said Croninger assignor to said Miller Application November 15, 1939, Serial No. 304,540

29 Claims. (Cl. 25—24)

This invention relates to methods and apparatus for manufacturing pottery ware. It has to do with a new method of ware production for the manufacture of what is known as "jiggered" ware, such as for instance, cups, bowls, plates and the like from plastic ceramic material in or on absorbent molds. However, this invention is not limited to the manufacture of jiggered ware since certain of the principles may be applied to the manufacture of pressed ware.

This invention also has to do with new and improved fabricating apparatus having means for performing plural fabricating operations of the same or different character with or without variation in the operations involved, said operations being carried out whilst the mold carrier is in continuous motion. The principles embodied in this invention are illustrated, by way of example, in a rotary table type machine wherein the mold carrier is preferably circular and carries said molds in a circular path.

This invention comprehends the manufacture of semi-vitreous, vitreous, china and earthenware products which may be dried, glazed, fired and decorated by conventional processes.

One object of this invention is to provide for continuously turning out ware of the class described in similar or different shapes in large quantities. Another object is to produce preformed-jiggered, particularly press-jiggered, ware of the same or diverse character. A further object is to provide a new high speed method of manufacturing ware of the class described from clay mass to formed product. Still another object is to manufacture various kinds or shapes of pottery ware concurrently on a single unitary machine having provisions for applying to each class of ware undergoing fabrication the treatment best suited to the production thereof.

This invention contemplates the provision of a rotary table type pottery ware making machine. The table has continuous motion to thereby impart continuous motion to molds in the fabricating position. The ware is first preformed by pressing or spreading and thereafter completed by profiling, all whilst the molds are in continuous motion about the axis of the turntable. Various means are provided for regulating and adjusting the machinery in order to manufacture ware of various sizes, types, form and composition.

Furthermore, the invention contemplates the provision of fabricating tools mounted to move with the turntable or mold carrier. Said tools are caused to co-operate with the molds during a given portion of travel of the turntable during the complete revolution, the molds being placed in the chucks of the turntable and removed therefrom by hand during the interval whilst the tools are out of co-operation with the work. The machine also includes means for trimming and lubricating the ware, automatically operable to perform these functions during the operation of the machine. There are also means provided for collecting and disposing of excess material produced during the forming operation.

This invention also contemplates a method of manufacture which comprises preforming and profiling pottery articles on absorbent molds whilst the molds and tools are in continuous motion about an axis, the molds being moved to various locations between fabricating operations.

Other novel features not specifically mentioned thus far will be noted in the accompanying description and drawings wherein:

Fig. 1 is an elevation of the preferred form of fabricating machine with certain of the parts broken away and others shown in section, the machine being set up to press and jigger ware having a difference in the shape thereof.

Fig. 2 is a top plan view of the machine of Fig. 1 with various of the mechanism broken away.

Fig. 3 is a sectional view of a rotary valve for controlling fluid application.

Fig. 4 is a view of a rotary spreader tool used in spinning.

Fig. 5 is a view showing an oval shaped tool used in forming and Fig. 5a, a top plan view thereof.

Fig. 12 is a chart illustrating the operation sequence of the machine when engaged in plural fabricating operation on a diversified production, the setup being for hollow ware and flatware and corresponding with the setup shown in Figs. 1 and 2.

Fig. 13 is a top plan view showing a production system setup and the positions and number of operators preferably engaged in operating the machine with a car type mold conveyor and tunnel dryer.

Fig. 15 is a view showing a mechanism for reciprocating and rotating fabrication implements, operated by electricity.

Fig. 16 is a fragmentary view of an electric switch utilized in connection with the apparatus of Fig. 6.

Fig. 17 is a side elevation of a cam operated batting out mechanism.

Fig. 18 is a fragmentary view showing a cam operated spreader mechanism.

Fig. 19 is a view diagrammatically illustrating a plural table arrangement, the fabrication being divided therebetween.

The present invention comprehends methods and apparatus for manufacturing various kinds and shapes of pottery ware among which is included pressed ware, pressed-jiggered ware, jiggered ware, spun jiggered ware, preformed-jiggered ware and other types, these terms being derived from the processing the product receives in the fabrication thereof.

Figures 1, 2, 3, 4, 5, 5A:
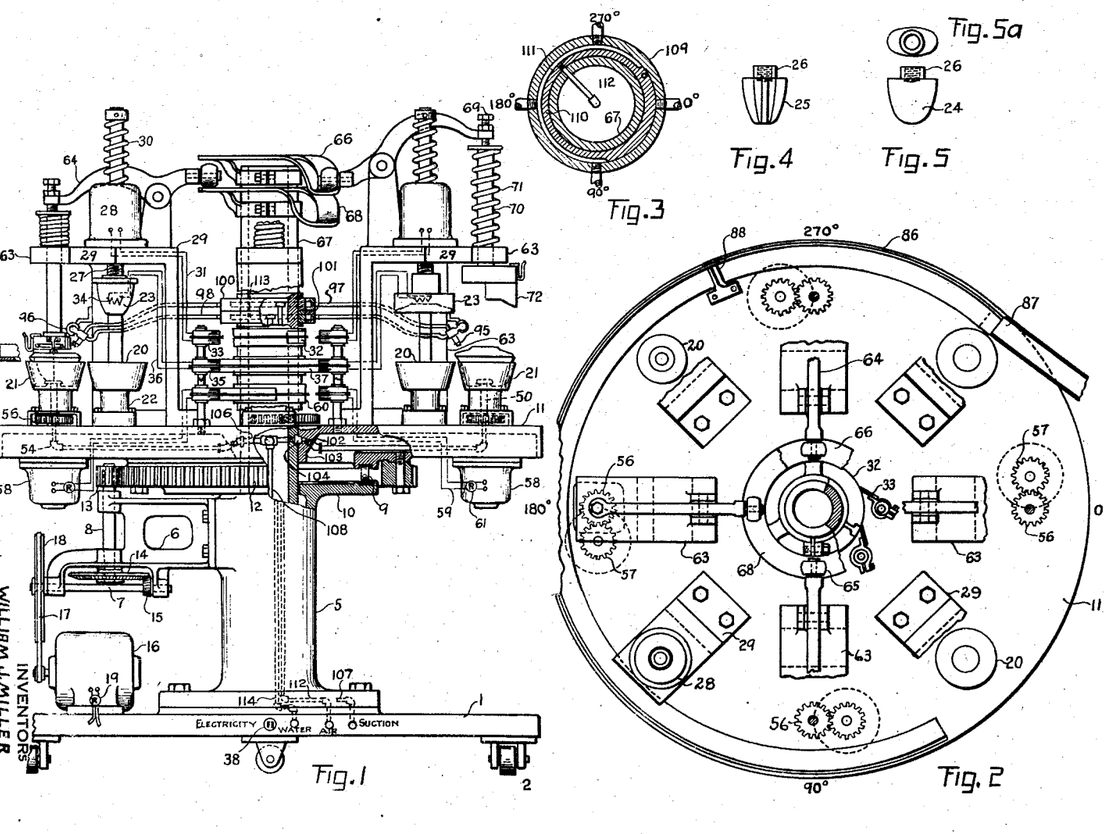

The machine disclosed in Fig. 1, which illustrates the principles embodied in this invention, is set up to manufacture pressed-jiggered ware in diverse shapes, namely cups and plates of conventional design from plastic jiggering clay on absorbent plaster molds.

It will be understood that production is not limited to this kind or class of pottery ware and that the setup may be changed and other kinds and shapes of pottery ware made, the maximum number of different shapes the illustrated machine may operate on at one time being four. The invention however is not limited to a machine having any specified number of heads, since it is within the spirit and scope of this invention to operate any number of heads up to the limit of practicability for any size machine of this character.

Figures 12, 13, 15, 16, 17, 18, 19, 21:
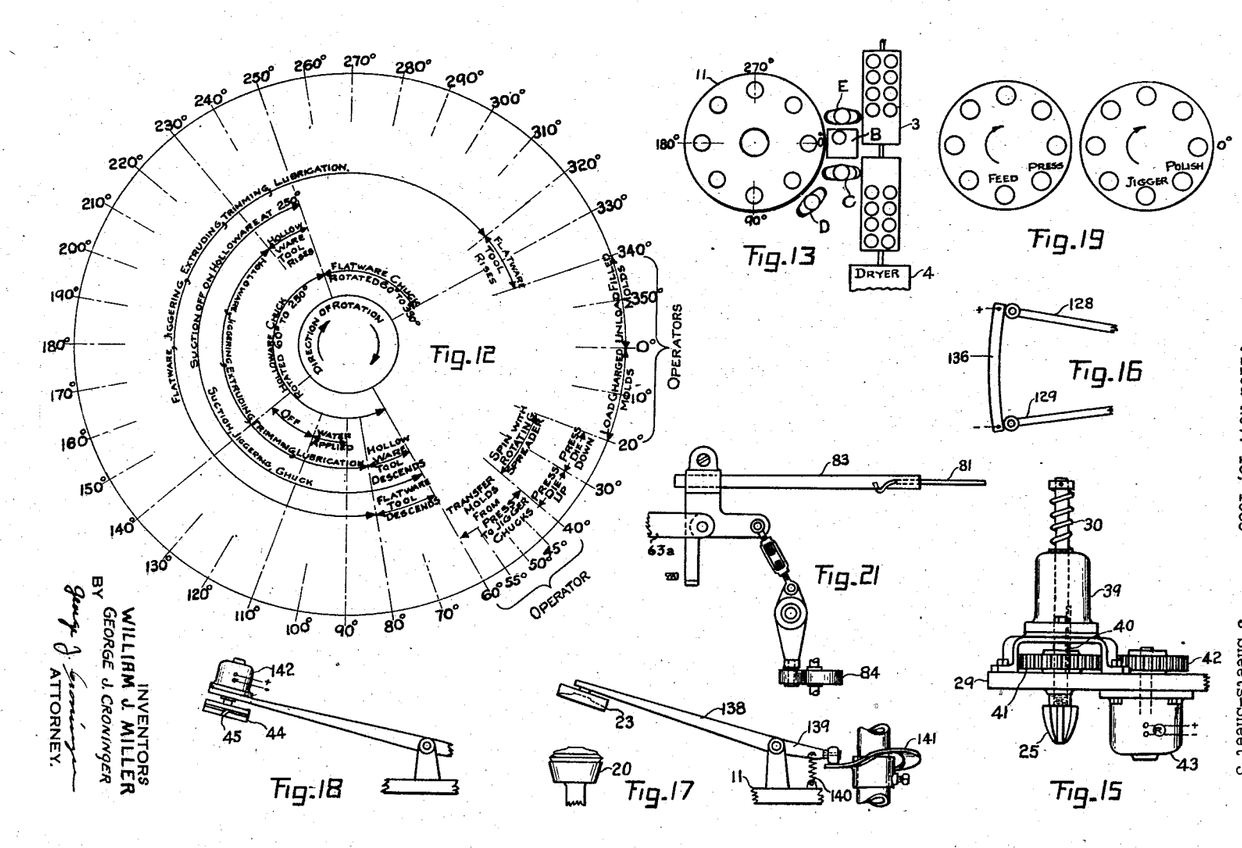

The circular base 1 of the machine in Fig. 1 is mounted on wheels 2 so that it may be moved into operative adjacency to the baller or batterout's bench B, Fig. 13, which is located along the side of the bar type mold conveyor 3, the cars being connected together for directional travel through a tunnel dryer 4, this arrangement being illustrative only and indicative of the fact that the molds are preferably transported through a dryer on another mold carrier, however, with suitable arrangements, the molds may be carried through a dryer on a conveyor which is connected to and synchronously driven with the machine of Fig. 1, this arrangement being disclosed in a co-pending application, Serial No. 413,734, filed Oct. 6, 1941, or if desired, the molds may be transferred between the machine and dryer mechanically by picking them up and depositing the same on the dryer conveyor with apparatus such as that disclosed in a co-pending application, to William J. Miller, Serial No. 219,385.

Bolted to the center of the base is a hollow vertical column 5 having a bracket 6 for supporting power shafts 7 and 8. Rotatably mounted on column 5 on rollers 9 resting on a flange 10 is a circular mold carrier 11 adapted to be continuously rotated through a ring gear 12 secured thereto, pinion 13 and bevel gear 14 on shaft 8 and pinion 15 on shaft 7. Shaft 7 is rotated by motor 16 through belt 17 and pulley 18, there being a rheostat control 19 in the motor circuit whereby the speed of rotation of the table may be varied whilst the driving connection subsists. It is understood that other types of drives may be substituted for that disclosed without departing from the spirit and scope of this invention.

Mounted on the upper surface of the circular mold carrier 11 and spaced at 45° apart adjacent the perimeter, Fig. 2, are a plurality of mold chucks 20 and 21 with complemental fabricating mechanism thereabove, each chuck and its companion fabricating mechanism forming a co-operative unit. These chucks support the plaster molds whilst on the table and whilst fabricating operations ensue. Those designated 21 are jigger chucks, that is to say, chucks which support the molds during jiggering or polishing and those designated 20 are preforming chucks or chucks which support the molds during preforming, viz: pressing, spinning, etc.

These chucks and fabricators may be considered as being arranged in groups of two and starting at the zero degree position in Fig. 2 and continuing in a clockwise direction there are four groups shown, the press chuck 20 at the 45° position leading the jigger chuck 21 at the zero degree position and so on around the table. In the embodiment shown in Fig. 1, the molds are shifted manually between the chucks of each group being first placed in the preforming chuck and after preforming has been completed being shifted to the jigger chuck, the table being in continuous motion all the while. In view of the fact that a diversified production is contemplated and in some instances this may involve molds having different external shapes and base dimension, it is understood that the chucks may be of correspondingly different shape and internal dimension to properly fit the same. Thus, on the left hand side of Fig. 1, the chucks are constructed to fit hollow ware molds while on the right hand side, flat ware molds are accommodated.

The press chuck 20, Fig. 1, comprises a hollow body portion lined preferably with a resilient material as disclosed in copending application Serial No. 205,711 shaped to fit the mold boss, the material absorbing shocks and preventing localized bending strains on the mold during pressing. Each chuck is adjustably mounted on a stand 22 the base of which is adjustably bolted to the mold carrier, the object being to enable regulation so as to obtain central positioning relative to the axis of the shaft of the over-head preformer. As shown, the chuck is vertically stationary relative to the fabricating mechanism.

Preforming may be accomplished by any one of several instrumentalities, for instance, the die 23, Fig. 1, the oval shaper 24 of Fig. 5, or the rotating spreader 25 of Fig. 4. Each of these instrumentalities has a threaded boss 26 for connection with the shaft of an actuating or supporting means. In the case of Fig. 1, the machine is set up with a hollow ware press on the left hand side and a flat ware press on the right hand side, the difference being in the shape of the head or die 23 which has a molding surface contour co-extensive with that of the mold on which it operates. The dies are mounted on the core 27 of an electro-magnetic solenoid motor 28 which is bolted in inverted position on a bracket 29 bolted to the carrier 11. A reversing solenoid may be used or the core may be projected downwardly when the motor is energized and retracted by a spring 30 when the circuit is broken. The motor is connected in circuit 31 leading to a stationary collector ring 32, which is formed in upper and lower halves separated by an insulator, there being individual contacts 33 mounted on and rotatable with the carrier 11. It is preferred to operate this mechanism to spread the plastic material over the molding surface of the mold into the form of a blank of predetermined thickness by impact, the die striking the plastic material a blow as it engages the same. It may also be spread out more slowly by a progressive squeezing action.

The plastic material is preferably deposited on flat ware molds in the form of a slice of a diameter less than the circumference of the molding surface but of greater thickness than the thickness of the completed articles or blank. In the case of hollow ware, the charge either in the form of a ball, cylinder, or other preferably symmetrical shape, is deposited in the bottom of the mold. In both cases, it must be spread over the surface of the mold, however, it is within the scope of this invention to fully cover the molding surface of the mold with plastic material before the mold is placed in chucks 20. While there may be no need for pressing the clay if the plastic material is so applied beforehand unless it is desired to compact and densify it, the jiggering process may therefore be divided into a plural stage operation by the substitution of a roughing profile for the dies 23. In such event, the chucks 20 would be rotated and therefore may be substantially the same in construction and operation as the chucks 21 to be later described.

The dies are rendered non-adhesive preferably by electrically heating the press surface. For this purpose, heating elements 34 are provided which are connected in individual circuits 36 leading to brushes 35 engaging the stationary collector 37. Since there is no need to interrupt the heating of the dies during continuous motion of the table, the collector 37 is in the form of an uninterrupted ring divided vertically and the upper and lower sections relatively insulated and connected in a main circuit to a switch box 38, all collector rings being connected to this main circuit.

It is understood that the dies may be heated by means other than electricity, for instance, steam, or combustion, the chamber in the die in the latter instance being ventilated and a burner associated therewith. Moreover, the die may be rendered non-adhesive by constructing the face thereof of a permeable material and compressed air may be vented therethrough incident to retraction of the die.

Where a rotary spreader 25 is employed, the mechanism of Fig. 15 may be substituted for the solenoid 28. This mechanism comprises a solenoid motor 39, the shaft 40 having a gear 41 slidingly keyed thereon. The shaft is rotated by a gear 42 on the shaft of vertical motor 43, the entire assembly being mounted on a bracket such as 29 and controlled in operation by the circuit breaking collector rings 32 and 37. This mechanism provides for reciprocating and rotating the tool to thereby preform the material by a spreading action combined with a pressing action.

Where the oval former 24 is utilized, it is preferred to rotate this member and therefore it is preferably mounted on a (Figs. 5 and 5a) reciprocable and rotatable stem such as that just described in connection with Fig. 15. The action in this case is such that the clay is engaged at diametrically opposed points and spread whilst being pressed. It is understood that while the oval former and spreader tools are shown in hollow ware shape, they may be adapted for making flat ware as illustrated by the implement 44 shown in connection with the swinging tool arrangement of Fig. 18. In this case, the edge of the blades 45 follow the contour of the flat ware mold and are preferably inclined at an angle to the top surface of the mold and are resiliently held in place. The spreader is of course rotated when in engagement with the work, and in the case of Fig. 18, by motor 142.

Figures 6, 7, 8, 9, 10, 11, 14, 20:
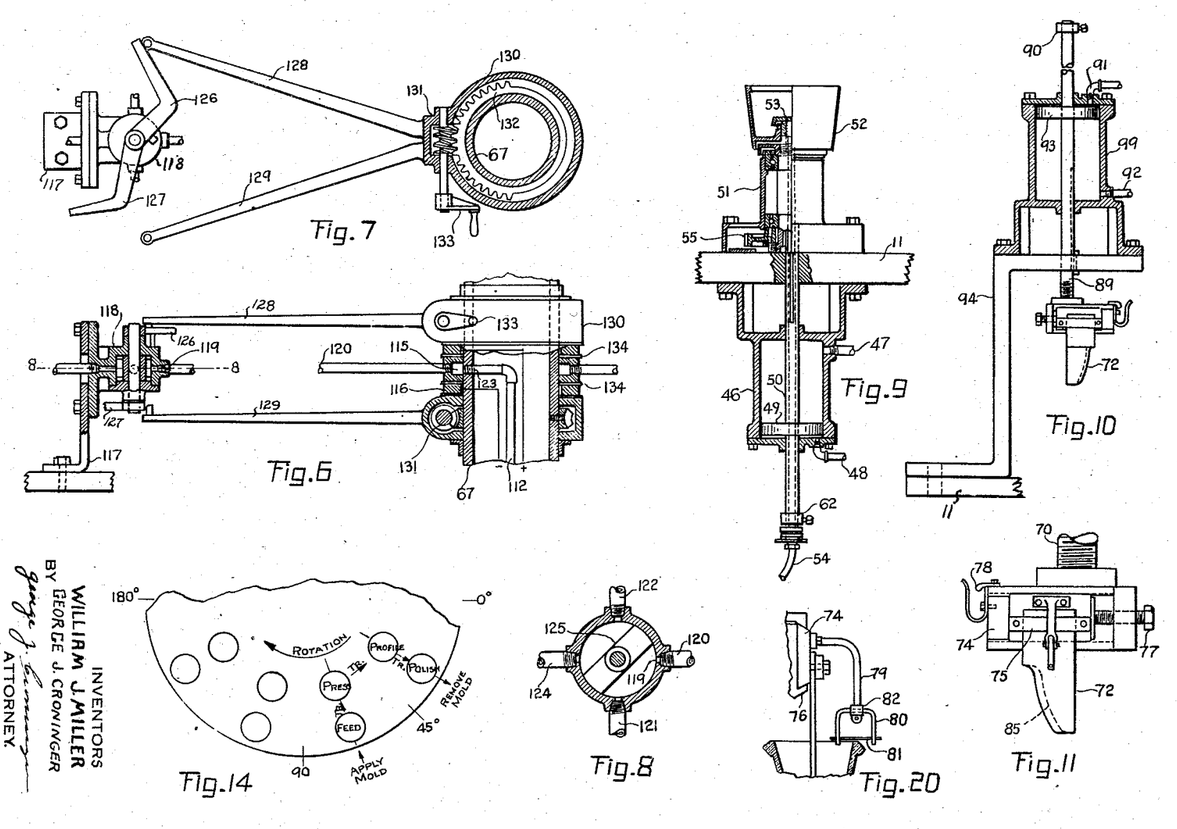
Fig. 6 is a sectional elevation of another form of valve and operating mechanism therefor which may be utilized in the regulation and control of fluid and electricity.
Fig. 7 is a top plan view of the apparatus of Fig. 6 with the lever adjustment provisions shown in section.
Fig. 8 is a section on the line 8—8 of Fig. 6.
Fig. 9 is a sectional elevation of a chuck and apparatus for elevating and lowering the same by means of compressed air or other fluid.
Fig. 10 discloses an alternative arrangement for reciprocating fabricating instrumentalities by means of compressed air or other fluid under pressure.
Fig. 11 is a detail view showing the profile and trimmer and mounting provisions therefor.
Fig. 14 is a plan view of a portion of a rotary mold carrier showing how the mold chucks and fabricating implements may be arranged radially instead of circumferentially thereof and also illustrating that the fabrication treatment or process may be broken up into numerous stages, it being within the scope of this invention to preform certain operations on one machine and the balance on another machine as diagrammatically illustrated in Fig. 19.
Fig. 20 is a fragmentary view of a trimmer and holder therefor, and Fig. 21 a view showing another form of trimmer.

It is to be understood that the mold may be moved toward and away from the preformer instead of remaining stationary as shown in Fig. 1. Also, both the preformer and mold may be moved into closing engagement. Fig. 9 discloses mechanism for lifting and lowering a mold chuck which comprises an air cylinder 46 having compressed air pipe connections 47 and 48 above and below the piston 49 respectively. The hollow piston rod 50 extends through a stuffing box up through bearings in the stationary stand 51 and is bolted to a boss in the base of the check body 52, there being an outlet 53 for suction, a connection being made at the lower end of the shaft with a flexible tube 54 leading to a source of suction. The air cylinder is preferably bolted to the underside of the table and is controlled in operation by apparatus to be hereinafter described. Also, by mounting a sliding gear 55 on the piston rod and rotating it by means of the gear 42 and motor 43 of Fig. 15, the chuck may be rotated. Suction helps prevent slipping and dislodgement of the mold when rotated and it will be understood that if desired the mold may be rotated relative to the tool in any of the preforming operations described if desired. An adjustable collar 62 limits the altitude of reciprocation.

Referring to Fig. 17, there is disclosed therein apparatus which may be substituted for the solenoid motor 28 in the operation of the preforming instrumentalities. This apparatus consists of a pivoted lever 138 which would normally be set radially relative to the vertical axis of the machine of Fig. 1 on carrier 11 with the preforming implement, in this case a die 23, adjustably mounted near the extremity of the long arm and in registration with the mold chuck 20 when the lever is in the lowermost position. The short arm 139 of the lever engages a horizontal stationary cam 141 fastened to the center column of the machine, the lever being counterbalanced by a spring 140. As the table rotates, the die is alternately raised and lowered to fabricate clay deposited on the mold seated in the chuck.

Thus, with regard to preforming, we have disclosed means in the form of a die which may be utilized for impact or progressive spreading in the production of pressed or pressed-jiggered ware, a rotary spreader which may be utilized in forming a bat or blank directly on the mold in the manufacture of spun or spun-jiggered ware or in the forming of bats directly on the mold; a profile which may be employed for roughing purposes thereby subdividing the jiggering process into two stages or, in the case of cups may be used to complete the article as far as the removal of excess material and shaping of the ware is concerned in a one step fabrication process and lastly, an oval shape former which does the work of spreading and forming the material by a pressing and/or spinning action.

In the machine of Fig. 1, the jigger chucks 21 have a hollow body portion or socket in which the mold boss or tang is snugly fitted and centered. The chuck is substantially as described in connection with Fig. 9 and the stationary stand is adjustably bolted to the table 11. The hollow shaft 50 is not reciprocable in this instance but is rotated by means of a sliding gear 56 and gear 57 on the shaft of motor 58 bolted to the underside of the table, Figs. 1 and 2, and connected in a circuit 59 to commutator ring 60. A rheostat 61 is provided in the circuit in order to vary the speed of rotation of the chuck. The speed of rotation required for different classes of ware may vary, for example, cups may be fabricated at a speed of 900 R. P. M., saucers 750 R. P. M., bowls 600 R. P. M. and large dinner plates at 350 R. P. M. Thus with the setup shown in Fig. 1, the cup jigger chuck on the left hand side of the machine may be operated at 900 R. P. M. whereas the plate jigger chuck on the right hand side of the machine may be operating at only 750 R. P. M.

It is desired to stop the rotation of the chuck once the fabrication has been completed, therefore, motors 58 may be dynamically braked so as to quickly stop chuck rotation when the circuit is deenergized or an independent brake (not shown) may be utilized. It is preferred to grip the mold to the chuck incident to rotation thereof as hereinbefore mentioned. In the case of the machine of Fig. 1, this is done preferably by vacuum, albeit other methods may be used such as for instance the magnetic provisions disclosed in Patent #2,046,525. While the jigger chucks shown in Fig. 1 are not elevatable, it is understood that these chucks may be elevated if desired by means of the air cylinder arrangement of Fig. 9 which provides also for the rotation thereof.

The jiggering units are mounted on brackets 63 in juxta-position to the chucks 21, the brackets being bolted to the table and movable therewith. These units comprise a rocker arm 64 having a roller 65 at one end in engagement with a stationary cam. The contour of the cam depends upon the production, thus in the machine of Fig. 1, cam 66 bolted to column 67 is contoured so as to depress the profile over a greater arc of travel of the table than cam 68, because it is desired to jigger flat ware for a longer interval than hollow ware. The other end of the rocker arm has an adjusting stud 69 in engagement with a vertical reciprocable push rod 70 non-rotatably mounted in the bracket 63. A spring 71 normally maintains this push rod in elevated position and the lowermost point of travel of the profile 72 is determined by adjustment of screw 69. The profile is mounted in a holder 73 secured to the lower end of the push rod which comprises, Fig. 11, a horizontally sliding dovetailed block 74 to which the profile is adjustably secured by a bar 75. The bracket is grooved at 76 to receive the block 74 and the profile is positioned laterally relative to the work by screw 77. The block is secured in adjusted position by a releasable lock 78.

While only two cams are shown it will be obvious that additional cams may be provided, one to each profile unit if necessary where there is a greater production diversification. Thus, in the machine of Fig. 1, this diversification may be a maximum of four. This enables the optimum in the way of movement, dwell, rate of descent and ascent and dwell of the profile to be obtained for each of four different kinds of ware capable of being made on the machine illustrated. Sometimes one cam will be suitable for more than one kind of ware, for instance, two cups differing in shape or size but not sufficiently to cause any variation in the jiggering thereof. It is also understood that the production may be all the same and only one cam used to operate the rocker arms. The cams are preferably separable so that they may be quickly exchanged, or they may be of the adjustable track type so as to obtain variation without removal.

The profile assembly is provided with a trimmer 79, preferably mounted on the block 74, and it is adjustable so as to position the trimming instrumentality at various angles relative to the work. This device comprises a yoke 80 with a wire or a blade 81 held between the legs, the yoke being adjustably and frictionally gripped in a clamp holder 82, as shown in Fig. 20.

Other forms of trimmers may be utilized, for instance any one of those disclosed in a co-pending application to William J. Miller, Serial No. 209,667, and if desired, a trimmer such as that shown in Fig. 21 may also be used. In this type of trimmer the wire is unsupported at one end and is held at the other in a tubular holder 83 which may be pivotally or stationarily mounted on an extension 63a of bracket 63. If pivotally mounted, a cam 84 may be used to move the wire into and out of engagement with the work. If rigidly mounted, the wire is set at a height so that the mold brim engages it. The wire in each instance is preferably flexible so that the mold will not be scored from frictional engagement therewith.

The excess clay produced during jiggering is extruded through a groove 85 in the profile tool beyond the perimeter of the carrier 11 and into an elongated semi-circular collecting ring 86, the trimmings produced by the wire or blade 81 being also projected thereinto. The waste clay is propelled toward a chute 87 by a scraper 88 secured to and rotatable with the table at the level of the floor of the collecting ring. Means such as a wheelbarrow or conveyor belt may be disposed below the end of the chute for receiving the scraps. With this arrangement, there is no need to interrupt the operation of the machine in order to dispose of the trimmings.

If desired, the profile may be reciprocated by compressed air (instead of by cam actuated apparatus) as disclosed in Fig. 10. In this case, the tool mounting bracket is threaded onto the end of a piston rod 89 having a collar 90 for limiting the lowermost position of travel. Compressed air is supplied to the inverted cylinder 99 by means of pipes 91 and 92 respectively in order to move the piston 93 in opposite directions, each line having an exhaust valve therein. The cylinder is mounted on a bracket 94.

Lubricant is supplied to the work by means of atomizing nozzles 95 which are adjustably mounted on bracket 63 by means of a universal joint 96 and have controls (not shown) for regulating the character of the spray. Each nozzle has supply lines for compressed air and lubricant, preferably water, these being in the form of flexible tubes 97 and 98.

We have thus disclosed apparatus by means of which the same or various kinds of ware may be profiled, either to the extent of actually removing material and forming the exposed surface of the ware or lightly polishing the same if the surface has been reduced to proper cross sectional thickness and shape or form at a previous station. The adjustments thus far described enable the profile tools and trimmers to be set to properly perform the operations mentioned.

In the control of liquid, suction, and compressed air where utilized herein in the operation of various of the mechanisms of the machine of Fig. 1, we have shown, in connection with the suction lines 54 leading to the chucks 21, a rotary valve arrangement built into the carrier and a pair of rotary valves 100 and 101 for controlling the water and air lines 97 and 98 leading to the nozzles 95 mounted on the column 67 below the cams. Also, in Figs. 6, 7, 8 and 16, we have shown other control devices for air, liquids and electricity which may be substituted for those about to be described, the feature of the latter provisions being that adjustment may be made whilst the driving connection subsists or, in other words, without stopping the machine. It is desirable at times to make adjustment in the starting point or time of water application and the time of shut off; also, to regulate suction or compressed air in order to grip the molds at the proper moment or release the same or vary the operation as well as cause the tools to descend or the chucks to rise or vice versa at instants selectively determined by manipulation of conveniently accessible controls.

With reference to the machine of Fig. 1, each of the suction lines 54 terminates in a port 102 in the wall of boss 103 of carrier 11 in registry with a groove 104 in the wall of stationary center column 5. The groove 104 is interrupted at points where suction is to be discontinued as will later be described. One or more main headers 106 leading from a main input line 108 having pipe connections 107 in the base of the machine are connected to the groove 104, thereby providing for the quick disconnection of the line from a source of suction if the machine is to be moved. It is desired that bleeder ports be located at points wherever suction is interrupted so as to vent the lines 54 to atmosphere.

With regard to the valves controlling air and water supplied to the spray guns 95, these valves consist of a revolvable outer ring portion 109 and a stationary inner portion 110, Figs. 1 and 3, fastened to the inner stationary column 67. The groove 111 in uppermost of these valves is connected to an air header 112 and the groove 113 in the lower valve to a water header 114. The lines 97 and 98 are screwed into fittings in the rings 109 terminating in ports registering with the grooves 111 and 113 respectively. It is preferred that the lines 97 and 98 be rigid and securely fastened to the table so as to rotate the rings to which they are attached although the rings may be fastened to the table by other means and rotated therewith.

Each header is connected to a threaded inlet bushing in the base of the machine so that outside supply lines may be easily attached. As in the case of the suction valves, these grooves are interrupted at points on the circle where it is desired to discontinue the supply of fluid to the nozzles. Also, more than one pair of rotary valves may be utilized to satisfy the requirements of a diverse production, each nozzle or group of nozzles being individually controlled. It is understood that more than one nozzle may be directed on a single piece of ware and all may be hooked up and operated on the same line or different lines.

While the valves just described initiate and terminate the supply of fluid at predetermined points, it is to be understood that the control shown in Figs. 6 and 7 may be substituted therefor so that adjustment in this respect is more readily possible. In this arrangement, the header, whether it be an air header 112, or water header 114, or the suction header 108, terminates in a port 123 in registry with a groove 115 in rotatable ring 116. Mounted on a bracket 117 fastened to the table 11 is a valve 118 with an inlet 119 connected by a pipe 120 to groove 115. The valve has an outlet 121 which may be connected to the air inlet side of a spray gun 95 and another inlet 122 which may be connected to a water line, there being an outlet 124 leading to the water inlet side of the spray gun 95. When the valve core 125 is rotated 45° counterclockwise of the position shown in Fig. 8, the supply of water and air will be shut off.

In operating the valve core 125, a lever 126 is secured to the top of the core and a lever 127 to the bottom. These levers are adjustable and as shown project in opposite directions, one being set at an angle to the other, the object being to alternately swing the valve core 45° to open and closed position when engaged by the normally stationary levers 128 and 129 during rotation of the carrier. Each lever 128 and 129 is formed as a part of a gear housing 130 which has a worm 131 mounted therein in engagement with a gear 132 secured to a tubular support, for instance, the column 67. When crank 133 is turned, the levers 128 and 129 are repositioned circumferentially of the carrier 11, thereby making it possible to vary, whilst the machine is in operation the moment of initiation and discontinuation of the supply of fluid to the work. It can readily be seen how this arrangement may be utilized in controlling the supply of compressed air to cylinders 46 and 99, Figs. 9 and 10, to synchronize the operation of the chucks 20 or 21 and the reciprocation of the fabricating tools with the rotation of the carrier 11. Moreover, the suction line may be controlled by this means.

There is also shown in connection with this valve mechanism an arrangement for controlling the electrical circuits which may be utilized in place of the collector rings shown on the machine of Fig. 1, the added advantage being that the instant of energization and deenergization of various circuits may be regulated whilst the machine is in operation. The valve 118 may, in this case, take the form of a switch with the inlets 119 and 122 becoming contact points electrically connected to lines 134 in ring 116. The outlets 121 and 124 would then become contact points electrically connected to line 134 in ring 116. The valve core 125 becomes a circuit breaker alternately making and breaking the circuits at predetermined instants as controlled by the setting of levers 128 and 129. Thus, the solenoid motors, chuck rotating motors, heating elements, and any other electrically operated apparatus forming a part of the machine, except the driving motor, may be synchronously controlled with the operation of the carrier 11 and adjusted without stopping the rotation of the table.

Fig. 16 discloses another way in which this may be done; levers 128 and 129 may each be connected in individual circuits and are adapted to contact a shoe or shoes 136 carried by the table, the shoe being in a circuit to any one of the electrically operated devices mentioned. The position of the levers 128 and 129 being adjustable, the circuits may be opened and/or closed at any desired degree of rotation of the carrier 11. It is understood that the gear 132 may be continuous instead of interrupted as shown so that the levers may be swung 360°.

The operation of the machine has been indicated to some extent in connection with the description of the several portions of the apparatus, but for convenience the consecutive operations of the preforming and forming mechanisms in the manufacture of a diversified production will be described, reference being had to Figs. 1, 2 and 11.

It will be assumed that the machine is to be operated, in the manufacture of press-jiggered ware in two shapes, cups and medium size plates. As the molds on conveyor 3 approach the operator C, Figs. 12 and 13, they are removed by him and if the dried ware has not been previously stripped therefrom he may do so. It is preferred that the cup molds be in one line and the plate molds in another however they be arranged in a single line in groups of two, or if the machine has more heads then in the requisite number to satisfy the grouping of the fabricating units on the machine.

Operator C who stands adjacent the 0° position of the carrier 11 in Figs. 12 and 13 applies clay to the molds and has a bench B on which a supply of plastic material from which charges are made is disposed. He may place this clay in or on the mold by hand or an automatic feeder such as disclosed in Patent No. 2,046,525, or any of the patents mentioned therein may be provided.

The fabricating units are arranged on the machine in sequence and in two groups, that is to say, the table is fitted with chucks and fabricating units in the following order: Fig. 2, (considering that the table is stationary) at the 0° position, flat ware jigger chuck and profile; 45°, flat ware press chuck and die; 90°, hollow ware jigger chuck and profile; 135°, hollow ware press chuck and die; 180°, hollow ware jigger chuck and profile; 235°, hollow ware press chuck and die; 280°, flat ware jigger chuck and profile; and 325°, flat ware press chuck and die.

Considering now that the table is rotating clockwise, the operator C places a charged flat ware mold in a flat ware press chuck as it passes between 0° and 20°, Fig. 12, and at 20°, the circuit to the solenoid 28 is energized and the die descends striking the clay charge with the force of impact and spreading the clay over the molding surface, this operation being performed in 10° more of rotation of the table and retraction of the die occurring in the next 10°. Thus, at the 40° position, the clay has been pressed out on the mold, the die elevated and the mold ready for transfer as the chuck travels between the 40° and 50° position by a transfer boy D who stands at this point and lifts the mold out of the press chuck and places it in the empty jigger chuck therebehind.

It is understood that the operation of pressing may consume a greater period of time if desired, however, we prefer to press the clay by impact and immediately withdraw the die so that not only may this operation be quickly performed but there will be little delay in commencing the profiling operation. We have found, particularly in the case of flat ware such as plates, that impact spreading produces a finer blank less apt to develop crookedness or other defects in bisque firing and therefore prefer this method. It is understood that the clay may be pressed out more gradually by moving the die into co-operation with the clay at a slower rate of speed and the means for doing this has been disclosed in the air cylinder mechanism and control mechanism, or the swinging arm die support. Where it is desired to preform the clay by spreader action, it is preferred to allow more time for the operation and in this case the tool would move into co-operation with the work at or about 20° past the 0° position and remain in engagement for at least 20° of travel of the chuck past this point over to at least 40° before the tool disengaged and the transfer boy in such event would stand beyond the point previously indicated to remove the mold to the following jigger chuck of the unit. Where it is desired to use the oval former or a profile, it is preferred that the preforming operation continue for at least 20° of rotation as in the case of the rotating spreader, however, it is to be understood that any of the figures given thus far are subject to variation within the limits of practical potting.

After the flat ware blank has been made and the mold shifted to the jigger chuck, which the transfer boy does as the chucks pass between 40° and 50°, Fig. 2, the jigger tool or profile 72 descends and remains in engagement with the work to at least the 340° position thereby providing ample time for the reliable completion of the operation. It is desired to apply suction to the jigger chuck at or about the 50° position so that it will be reliably gripped thereto and not thrown out as the chuck commences to rotate, this occurring before the tool engages the work and after the mold is deposited. The application of fluid may be intermittent or steady and preferably starts just before the tool engages the blank and is discontinued about the time the tool is withdrawn, the optimum technique depending on the need of the particular body undergoing fabrication for lubricant, as determined by the amount of material removed per revolution of the mold, the speed of penetration of the tool and other factors.

The trimmings produced are thrown clear of the mold and the top of the carrier 11 and will drop into the collecting ring which preferably extends from about the 50° position around to the 340° position.

When the flat ware units have passed by the 0° position, the operator C places a charged hollow ware mold in the next chuck in line which is a hollow ware press chuck. The operations of pressing or spinning ensue as before described in connection with flat ware followed by transfer to the jigger chuck and profiling, however, owing to the lesser amount of waste to remove and the normally shorter period of time required to complete the jiggering operation, the work is finished at or about the 180° mark and the tool is withdrawn at this point and the application of lubricant stopped. The chucks remain vacuumized on both flat and hollow ware to at least the 340° position or to the unloading zone which is shown here as commencing about the 340° line and continuing to the starting point. As indicated in Fig. 12, suction may be discontinued on the hollow ware jigger chuck at the 250° position. The rotation of the chucks ceases just after the tool is withdrawn.

At the unloading zone an operator E removes filled molds from the chucks and places them on the dryer conveyor. This operator is charged with the duty of overseeing the regulation and operation of the machine and should be a skilled jiggerman.

It will be understood that the operation of transferring molds between the chucks may be done mechanically if so desired as disclosed in application, Serial No. 413,734, heretofore noted.

Thus, we have provided in a single unitary machine, a high speed system of ware production wherein during continuous movement of the carrier, plural operations are performed best suited to the many and varied requirements of a diverse production, or the requirements of a production composed of pieces of the same kind. Not only this, but each fabrication unit is provided with such regulatory means that each may be individually adjusted to operate to best advantage on the product undergoing fabrication, whether the production be the same or diversified.

In case the machine is utilized as a double jigger, the roughing cut may take place during the first 160° of rotation of the table and finishing or polishing during the next 160° of rotation with 10° or 20° between operations to allow for transfer of molds. One profile tool could of course be operated in such a manner as to perform both operations, particularly in the manufacture of hollow ware so therefore, every head on the machine could mount a profile and pressing or preforming be dispensed with. Such an arrangement would enable the diversification of hollow ware production, that is to say, a cup or group of cups could be followed by one or more bowls or cups of different sizes or shapes and so on, the capacity of the machine of Fig. 1, for such diversification being in the order of eight. Likewise, the carrier may be set up entirely for preforming, the jiggering being conducted on a companion table as illustrated in Fig. 19 or, as illustrated in Fig. 14, the mold chucks and units may be arranged in radial pairs thereby doubling the capacity of the carrier 11 of Fig. 1.

Also, as illustrated in Fig. 14, four separate operations could be performed during one revolution of the table, viz: the molds could be transferred between chucks starting with the feeder chuck where clay would be applied say at the 0° position, Fig. 2, transferred to the press chuck and pressed at 45° position, then transferred to the jigger chuck and profiled at the 90° position and polished from 160° to 320°. It is preferred however where this many operations are contemplated to divide the procedure between two tables as shown in Fig. 19.

To insure application of the proper mold to the proper station, we prefer to apply a different color to each type of ware mold and a like color to the chucks or a placard at the proper station. The color (preferably vegetable) may be mixed with the plaster when making the molds or applied prior to use.

It will be understood from the foregoing that the fabrication technique involved in the manufacture of various kinds and shapes of ware is not always the same and may for instance range from small variations in such procedure as the length of time the tool or lubricant is applied to the omission entirely of a step as in the optional elimination of the press step in making cups. In other words, it is an aim of this invention to have each fabricating unit operating in accordance with the best fabricating technique for any class of ware being produced thereby, although, as between different units, such technique may be different or may vary, the ultimate object being of course the concurrent manufacture of a diversified production according to the fabrication technique best suited to each shape made.

It will also be understood that by a diverse production, we mean pieces of pottery ware among which some distinction exists, for instance by reason of dissimilarity or variation in materials, outward appearance, viz: shapes, sizes and design, or even in the technique of fabrication, the latter regardless of whether any similarity or dissimilarity resides in materials or outward appearance.

Having this described our invention, what we claim is:

1. In apparatus for fabricating pottery ware on absorbent molds, mold conveying means having continuous angular motion in the fabricating zone and means for preforming and forming pottery ware whilst the conveying means is in motion mounted to move therewith said preforming means including a die and means for rendering said die non-adhesive to clay.

2. In apparatus for fabricating pottery ware on absorbent molds, mold conveying means having continuous angular motion in the fabricating zone and means for preforming and forming a diverse production operable whilst the conveying means is in motion and mounted to move therewith said preforming means including dies having diversely contoured clay engaging surfaces and means for rendering said surfaces non-adhesive to clay.

3. In apparatus for fabricating pottery ware on absorbent molds, mold conveying means having continuous angular motion in the fabricating zone and means for preforming and jiggering pottery ware whilst the conveying means is in motion mounted to move therewith said preforming means including a non-adhesive die and said jiggering means including an edge profile.

4. In apparatus for fabricating pottery ware on absorbent molds, mold conveying means having continuous angular motion in the fabricating zone, a plurality of mold chucks mounted for movement with the mold conveying means, molds removably disposed in said chucks, means for forming diverse pottery ware operable whilst the conveying means is in motion mounted to move therewith said forming means comprising a plurality of profiles for making a diverse production, said profiles being arranged in consecutive order and means for consecutively co-operating said profiles with the work.

5. In apparatus for fabricating pottery ware on absorbent molds, mold conveying means having continuous angular motion in the fabricating zone, a plurality of mold chucks mounted for movement with the mold conveying means, molds removably disposed in said chucks and a plurality of means for fabricating pottery ware whilst the conveying means is in motion mounted to move therewith said molds being moved between fabricating means whilst said conveying means is in motion.

6. In apparatus for fabricating pottery ware on absorbent molds, mold conveying means having continuous angular motion in the fabricating zone, a plurality of mold chucks mounted for movement with the mold conveying means, molds removably disposed in said chucks, means for fabricating ware mounted to move therewith said means including a plurality of profiling and trimming instrumentalities, means for operating said profiling and trimming instrumentalities whilst the conveyor is in motion in making diverse articles the fabrication of which involves differences in fabrication technique, and means enabling variation in the fabrication technique applied.

7. In a continuously rotating jiggering machine, a rotatable mold carrier, press and jigger means mounted to rotate with said mold carrier, trimming means also mounted to rotate with said carrier, means for causing the operation of the press, jigger and trimming means whilst the table is in continuous movement and means adjacent said carrier for collecting the scrap clay produced during the trimming and jiggering operations.

8. In a pottery jiggering machine for fabricating ware on absorbent molds, a rotary table mounted on a stationary base, power means for rotating said table, said table having a plurality of mold chucks arranged in a circumferential line thereon, means for pressing ware mounted to rotate with said table, means for periodically co-operating the pressing means and molds whilst the table is in motion, means for profiling ware, means for periodically co-operating the profiling means and molds whilst the table is in motion including a cam, said molds bein transferred between chucks between press and jigger operations.

9. A continuous jiggering machine for forming plastic clay in absorbent molds comprising a stationary support, a plurality of co-operating mold chucks and fabricating implements continuously revolvable about the axis of said support, said mold chucks and fabricating implements being relatively movable, said fabricating implements including a plurality of pressing dies and a plurality of profiles adapted for the making of a diversified or identical production.

10. The method of continuously jiggering dinner ware in diversified shapes from plastic clay in or on absorbent molds which consists in first spreading the material in contact with the molding surface over the exposed areas of the molding surface while continuously moving the molds along one portion of a circuitous path and in another portion of said path forming the previously spread material during continuous movement of the molds therealong, and moving the molds from one location to another between spreading and forming operations.

11. In apparatus for manufacturing pottery ware, the combination of a rotary conveyor having uninterrupted directional travel in the fabricating zone, a plurality of mold chucks mounted for movement with said rotary conveyor, jigger molds removably disposed in said chucks, a plurality of profiles arranged in sequence located thereabove and means for co-operating molds and profiles whilst the conveyor is in motion including a cam.

12. In apparatus for fabricating pottery ware, mold conveying means having continuous motion, means for preforming and forming pottery ware whilst the conveying means is in motion mounted to move therewith, said preforming means including a rotating clay spreader.

13. In apparatus for fabricating pottery ware, mold conveying means having continuous angular motion in the fabricating zone, a plurality of mold chucks mounted for movement with the mold conveying means, jigger molds removably disposed in said chucks, means for profiling pottery ware whilst the conveying means is in motion mounted to move therewith, means for lubricating the ware during profiling and means enabling variation in the instant of initiation and cessation of the lubricating operation.

14. In apparatus for fabricating pottery ware, mold conveying means having continuous motion in the fabricating zone, means for preforming and forming pottery ware whilst the conveying means is in motion mounted to move therewith, a stationary scrap collector arranged adjacent said mold conveying means, a scraper attached to said mold conveying means and movable therewith for propelling scrap along said collector to a point of disposal.

15. In apparatus for fabricating pottery ware on absorbent molds, mold conveying means having continuous angular motion, means for preforming and forming pottery ware whilst the conveying means is in motion mounted to move therewith, said preforming means including a die having associated therewith heating means for rendering the forming surface of said die non-adhesive to clay.

16. In apparatus for fabricating pottery ware on absorbent molds, mold conveying means having continuous rotary motion, means for preforming and forming pottery ware whilst the conveying means is in motion mounted to move therewith, said preforming means including a die having associated therewith heating means for rendering the forming surface of said die non-adhesive to clay and means for varying the operating temperature of the die.

17. In apparatus for fabricating pottery ware on absorbent molds, mold conveying means having continuous angular motion, means for preforming and forming pottery ware whilst the conveying means is in motion mounted to move therewith, fluid spraying apparatus mounted to move with the conveying means and an adjustable valve for controlling the operation of said fluid spraying means.

18. In a pottery forming machine for making pottery ware from plastic clay on absorbent plaster molds, the combination of a plurality of movable mold chucks, a plurality of pressing die mechanisms including non-adhesive dies mounted to move therewith, a stationary cam common to all of said pressing die mechanisms for effecting pressing movement of said dies, a plurality of profiling mechanisms including edged profiles mounted to move with said mold chucks and a stationary cam common to all of said profiling mechanisms for effecting profiling movement of said profiles.

19. In a pottery forming machine for making pottery ware from plastic clay on absorbent plaster molds, the combination of a turntable having a plurality of mold chucks disposed thereon, means for continuously rotating said turntable, a plurality of pressing die mechanisms including non-adhesive dies mounted to move with said molds, a stationary cam common to all of said pressing die mechanisms for effecting pressing movement of said dies, a plurality of profiling mechanisms including edged profiles mounted to move with said molds, a stationary cam common to all of said profiling mechanisms for effecting profiling movement of said profiles, trimmers also mounted to move with said mold chucks and fluid applying mechanisms mounted to move with said mold chucks and means for effecting fluid applying operations thereof.

20. In a pottery forming machine for making pottery articles from plastic clay in or on absorbent plaster molds, the combination which comprises, a turntable having a plurality of mold chucks mounted thereon, means for continuously rotating said turntable, jigger molds removably disposed in said chucks, a plurality of die forming mechanisms including dies non-adhesive to clay mounted to move therewith, means for co-operating said dies and molds, a plurality of profiling mechanisms including edged profiles mounted to move with said molds and a stationary cam for effecting profiling movement of said profiles in consecutive order.

21. In a pottery forming machine, the combination of a plurality of ware preforming dies, molds and profiling mechanisms revolving about an axis, means for effecting preforming operations in successive order, and means for effecting profiling operations in successive order.

22. In a machine for fabricating pottery ware on absorbent molds, a rotary mold carrier having continuous motion, a plurality of preforming and jiggering tools arranged to coact with the molds to preform and jigger ware, means operatively connecting the tools with the carrier whereby the tools move with the carrier during the preforming and jiggering operations, said tools having working surfaces of different contour to provide diverse ware production.

23. In a machine for fabricating pottery ware on absorbent molds, a mold conveyor having continuous angular movement in the fabricating zone, an axially movable implement for initially forming ware shapes and another implement for completing the initially shaped ware, and means operatively associating said implements with the conveyor whereby said implements perform their respective functions whilst the conveyor is in motion.

24. In a machine for fabricating pottery ware on absorbent molds, a rotary mold carrier having continuous movement in the ware forming position, a plurality of profiles, axially movable members supporting said profiles, means mounting said profiles and their supporting members for movement in unison with the carrier, and means for reciprocating said supporting members whilst the carrier is in motion.

25. In a machine for fabricating pottery ware on absorbent molds, a rotary carrier for molds having continuous motion in fabricating positions, a plurality of jigger units mounted to move with the carrier and having fabricating tools shaped to produce different types of ware and means for trimming the ware and applying fluid thereto, and means cooperating said units with the molds while the carrier is in motion.

26. In apparatus for fabricating pottery ware on absorbent molds, a turntable, mold chucks thereon, jigger molds removably disposed in said chucks, profiling tools for jiggering pottery ware whilst the turntable is in motion mounted to move therewith, means for periodically imparting relative rotation between the molds and profile to shape clay on the molds into ware, a trough for receiving excess material mounted adjacent said carrier in the profiling zone, a discharge chute at one end of said trough, and means associated with said carrier for propelling excess material along said trough to said discharge chute.

27. A pottery ware jiggering machine having a turntable, means for imparting continuous motion to the turntable, a plurality of mold chucks mounted on the turntable for movement therewith, jigger molds removably disposed in said chucks, a plurality of profile tools also mounted for movement with the turntable, means operable to cooperate the profile tools and molds to jigger pottery ware whilst the turntable is revolving, means operable to produce relative rotation between the tools and the chucks during the jiggering operation and means operable to lubricate the ware during the jiggering operation.

28. A pottery ware jiggering machine having a turntable, means for imparting continuous motion to the turntable, a plurality of mold chucks mounted on the turntable for movement therewith, jigger molds removably disposed in said chucks, a plurality of profile tools also mounted for movement with the turntable, means operable to cooperate the profile tools and molds to jigger potteryware whilst the turntable is revolving, means operable to produce relative rotation between the tools and the chucks during the jiggering operation, means operable to lubricate the ware and means for trimming the ware during the fabricating operation.

29. A pottery ware jiggering machine having a turntable, means for imparting continuous motion thereto, flat ware mold chucks mounted on the turntable for movement therewith, flat ware jigger molds removably disposed in said chucks, a plurality of flat ware profile tools mounted on the turntable for movement therewith and arranged to co-act with the molds to jigger flat ware, means for moving the tools and molds into cooperative relation as they revolve with the tables about its axis, means operable to produce relative rotation between the chucks and the tools during the jiggering operation and lubricating means operable to wet the surface of the ware during the jiggering operation.

WILLIAM J. MILLER.
GEORGE J. CRONINGER.